United States Patent
Wang

(10) Patent No.: US 10,553,254 B2
(45) Date of Patent: Feb. 4, 2020

(54) METHOD AND DEVICE FOR PROCESSING VIDEO

(71) Applicant: BEIJING KINGSOFT INTERNET SECURITY SOFTWARE CO., LTD., Beijing (CN)

(72) Inventor: Wensi Wang, Beijing (CN)

(*) Notice: Subject to any disclaimer, the term of this patent is extended or adjusted under 35 U.S.C. 154(b) by 117 days.

(21) Appl. No.: 15/737,174

(22) PCT Filed: Aug. 10, 2016

(86) PCT No.: PCT/CN2016/094356
§ 371 (c)(1),
(2) Date: Dec. 15, 2017

(87) PCT Pub. No.: WO2016/202306
PCT Pub. Date: Dec. 22, 2016

(65) Prior Publication Data
US 2018/0197576 A1 Jul. 12, 2018

(30) Foreign Application Priority Data
Jun. 17, 2015 (CN) .......................... 2015 1 0337081

(51) Int. Cl.
G11B 27/28 (2006.01)
G11B 27/06 (2006.01)

(52) U.S. Cl.
CPC .............. *G11B 27/28* (2013.01); *G11B 27/06* (2013.01)

(58) Field of Classification Search
None
See application file for complete search history.

(56) References Cited

U.S. PATENT DOCUMENTS

| 6,597,859 B1 | 7/2003 | Leinhart et al. |
| 2010/0281375 A1* | 11/2010 | Pendergast .......... G11B 27/034 715/723 |
| 2013/0343598 A1* | 12/2013 | Kocks ............... H04N 21/8405 382/100 |

FOREIGN PATENT DOCUMENTS

| CN | 101409831 A | 4/2009 |
| CN | 101778257 A | 7/2010 |
| CN | 102427507 A | 4/2012 |
| CN | 102902756 A | 1/2013 |
| CN | 103747362 A | 4/2014 |

(Continued)

OTHER PUBLICATIONS

International Search Report dated Oct. 25, 2016, for corresponding International Application No. PCT/CN2016/094356, filed Aug. 10, 2016.

(Continued)

*Primary Examiner* — Eileen M Adams
(74) *Attorney, Agent, or Firm* — David D. Brush; Westman, Champlin & Koehler, P.A.

(57) ABSTRACT

Disclosed are a method and device for processing a video. The method includes: acquiring a processing instruction to an original video, in which the processing instruction includes information on a target length of a target video; comparing an original length of the original video to the target length, to obtain a compared result; selecting a main position interval of the original video according to a preset selection rule; and generating the target video having the target length according to the compared result and the main position interval.

15 Claims, 2 Drawing Sheets

(56) References Cited

FOREIGN PATENT DOCUMENTS

CN 104883478 A 9/2015

OTHER PUBLICATIONS

Written Opinion of the International Searching Authority dated Oct. 25, 2016, for corresponding International Application No. PCT/CN2016/094356, filed Aug. 10, 2016.
English translation of the Chinese Office Action from for CN Application No. 201510337081.9.
English translation of the Written Opinion of the International Searching Authority dated Oct. 25, 2016, for corresponding International Application No. PCT/CN2016/094356, filed Aug. 10, 2016.

* cited by examiner

METHOD AND DEVICE FOR PROCESSING VIDEO

CROSS-REFERENCE TO RELATED APPLICATION

This application is a Section 371 National Stage Application of International Application No. PCT/CN2016/094356, filed Aug. 10, 2016 and published as WO 2016/202306 on Dec. 22, 2016, not in English, which claims priority to Chinese Patent Application Serial No. 201510337081.9, titled as "method and device for processing video" and filed with the State Intellectual Property Office of P. R. China on Jun. 17, 2015, the entire content of which is incorporated herein by reference.

TECHNICAL FIELD

The present disclosure relates to the field of video processing technology, and more particularly, to a method and a device for processing a video.

BACKGROUND

Many websites (such as Social Networking Sites) support to share videos with others by a user with the rapid development of Internet technology, such that the user may communicate with the others through videos. Some websites define a length of the video shared by the user. If the length of the video shared by the user does not satisfy a defined length, the video shared by the user needs to be processed by the website or by the user. For example, if the length of the video uploaded by the user is defined to 10 s by a certain website and if the length of an original video is 50 s which is greater than the defined length, or if the length of the original video is 6 s which is less than the defined length, it needs to process the original video such that the length of the processed video is 10 s.

For a case that the length of the original video is greater than the defined length, a method for processing a video in the related art is to take a video satisfying the defined length starting from a preset video intercept position. For example, the preset video intercept position is a starting position of the original video, such that when the video is processed, the video satisfying the defined length is taken from the original video starting from the starting position.

For a case that the length of the original video is smaller than the defined length, a method for processing a video in the related art is to stretch the original video, so as to take a video satisfying the defined length from the original video starting from the preset video intercept position.

There are some disadvantages regarding to the methods for processing a video in the prior art. The preset video intercept position is set in advance, such that the video shared by the user needs to be taken from the original video based on the preset video intercept position, which may destroy a representation capability of the original video. As a result, content shown by the processed video is significantly different from that shown by the original video. For example, if the length of the original video is 100 s, the defined length is 10 s, and main content shown by the original video focuses on a time period 50 s~60 s, and if a partial video having 10 s is taken from the original video starting from the starting position, the content shown by the processed video cannot show the main content of the original video.

SUMMARY

The present disclosure provides a method for processing a video. The method includes:
acquiring a processing instruction to an original video, in which the processing instruction includes information on a target length Lt of a target video;
comparing an original length Ls of the original video to the target length Lt, to obtain a compared result;
selecting a main position interval of the original video according to a preset selection rule; and
generating the target video having the target length according to the compared result and the main position interval.

The present disclosure provides an electronic device. The electronic device includes a processor, a memory, a communication interface and a bus.

The processor, the memory and the communication interface are coupled and communicate with each other via the bus.

The memory is configured to store executable program codes.

The processor is configured to run a program corresponding to the executable program codes by reading the executable program codes stored in the memory, to perform the above method for processing a video.

The present disclosure provides a non-transitory computer-readable storage medium. The storage medium is configured to store executable program codes. When the executable program codes are running, the above method for processing a video is executed.

The present disclosure provides an application program. When the application program is running, the above method for processing a video is executed.

BRIEF DESCRIPTION OF THE DRAWINGS

In order to more clearly illustrate the embodiments of the present disclosure and the technical solutions of the related art, the drawings which are required to be used in the embodiments and the related art are briefly described. It will be apparent that the drawings in the following description are merely some embodiments of the present disclosure. Other drawings may be obtained from these drawings by those skilled in the art without any inventive labors.

DETAILED DESCRIPTION

In order to better understand technical features of embodiments of the present disclosure by those skilled in the art, in combination with drawings, more clear and complete descriptions will be made to the technical solutions of the embodiments of the present disclosure. Obviously, embodiments described herein are merely a part instead of all of embodiments of the present disclosure. Based on the embodiments of the present disclosure, other embodiments obtained by those skilled in the art without any inventive labors are all within the protection scope of the present disclosure.

Figure 1:
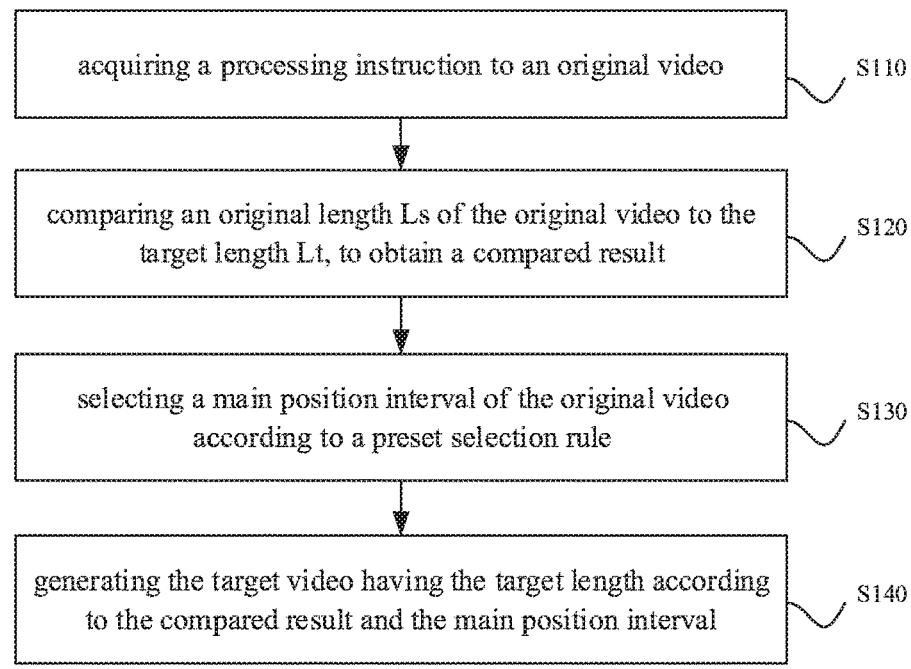
FIG. 1 is a flow chart illustrating a method for processing a video provided in embodiments of the present disclosure.

As illustrated in FIG. 1, FIG. 1 is a flow chart illustrating a method for processing a video provided in embodiments of the present disclosure. The method includes the followings.

At act S110, a processing instruction to an original video is acquired.

The processing instruction may include information on a target length Lt of a target video.

In practical applications, when it is required to process an original video such that a length of the target video after the processing satisfies the target length, technical solutions provided in embodiments of the present disclosure may be applied to process the original video. A common application is that, when a user wants to share one video on a website, as a length of a shared video is defined by the website, the video to be shared may not satisfy a length requirement of the website. In this case, the user may apply the technical solutions provided in embodiments of the present disclosure to process the original video to be shared by the user, such that the target video after the processing may satisfy the length requirement of the website. Alternatively, the technical solutions provided in embodiments of the present disclosure may be applied by the website to process the original video uploaded by the user, such that the target video after the processing satisfy the length requirement of the website.

After the processing instruction to the original video sent by the user or by the website is received, operations of an act S120 or an act S130 may be executed. The processing instruction may include information on the target length Lt of the target video. The target video is one generated after the original video is processed.

At act S120, an original length Ls of the original video is compared to the target length Lt, so as to obtain a compared result.

There is a size relation between the original length Ls of the original video and the target length Lt of the target video. By comparing the original length Ls of the original video to the target length Lt, the compared result may be obtained. It is to be illustrated that, processing a video by applying the technical solutions provided in embodiments of the present disclosure is to make a length of a processed video conform to the target length. When the original length Ls of the original video is same with the target length Lt, the user may directly share the original video without processing the original video.

At act S130, a main position interval of the original video is selected according to a preset selection rule.

It may be understood that, commonly an original video may desire to show certain content (i.e. main content). For example, for a dance-related video, a first half part of the dance-related video shows content about warming-up actions while a second half part of the dance-related video shows content about various dancing postures. The second half part of the dance-related video is what the dance-related video desires to show, which is the main content of the dance-related video.

A position interval where the main content is located in the original video is the main position interval of the original video. For example, for the original video having 10 seconds (i.e. the original video having 10 s), if the main content desired to be shown may focus on a time period 5 s~8 s, this period is the main position interval of the original video.

In practice, the main position interval may be selected according to the present selection rule. In detail, the selection rule may be set and adjusted according to practical solutions. For example, by collecting a large amount of user behavior data, such that a statistic and an analysis are performed to the user behavior data, as so to determine the main position interval of the original video according to a main position interval selected probably by most users. For example, when the original video is processed by most users, a certain fixed position (for example, a position of a first video frame) is selected to start to take a video having a certain length. Thus, the selection rule may be set as: taking the fixed position as a starting position of the main position interval, and taking the certain length as the length of the main position interval.

In a specific implementation of the present disclosure, the processing instruction may further include information on a content category of the original video. The act S130 may include the followings.

The main position interval corresponding to the content category of the original video is selected according to a preset correspondence between content categories and main position intervals.

It may be understood that, for videos having different content categories, the main contents of the videos are different from each other. For example, if the content category of the video is a scenery, the main content of the video may be shown at a front part of the video. If the content category of the video is a home action, the main content of the video may be shown at a later part of the video.

In practice, by analyzing the large amount of user behavior data, the videos having different content categories are determined, and positions of the main contents determined by most users are determined, thereby the correspondence between the content categories and the main position intervals may be set in advance. After the processing instruction to the original video is received, the information of the content category of the original video included in the processing instruction is obtained by parsing the processing instruction, so as to determine the main position interval corresponding to the content category. Therefore, the main position interval of the original video is selected.

In another specific implementation of the present disclosure, the act S130 may include the followings.

At step 1, a similarity between adjacent video frames of the original video is calculated.

At step 2, for any adjacent video frames, when the similarity is smaller than a preset threshold, it is determined that the adjacent video frames belong to sub videos having different scenes respectively.

At step 3, a position interval in which the sub video having a longest length is located is determined as the main position interval of the original video.

In order to understand conveniently, step 1 to step 3 are combined to illustrate.

It may be understood that, an original video may be captured in multiply scenes. The similarity of the adjacent video frames of the same scene is relatively high, while the similarity of the adjacent video frames of the different scenes is relatively low. According to the similarity of the adjacent video frames of the original video, at least one sub video included in the original video may be determined. The different sub videos may be understood as videos having different scenes.

After the similarity of the adjacent video frames included in the original video is calculated, for any adjacent video frames, if the similarity is lower than the present threshold, it is determined that the scenes are switched between the adjacent video frames, and it is thus determined that the adjacent video frames belong to sub videos having different scenes respectively. The longer the length of the sub video is, the higher the possibility that the sub video is the main content of the original video is. Therefore, the position interval where the sub video having the longest length is located may be determined as the main position interval of the original video. For example, after the similarity between the adjacent video frames of the original video is calculated, three sub videos are obtained. For example, the three sub videos are a sub video A having 5 s, a sub video B having 3 s and a sub video C having 10 s, then the sub video C may be determined as the main content of the original video. Furthermore, the position interval where the sub video C is located in the original video is determined as the main position interval of the original video.

It is to be illustrated that, after the processing instruction to the original video is obtained, the act S120 may be executed firstly and the act S130 may then be executed. Furthermore, the act S130 may be executed firstly and the act S120 may be then executed. Furthermore, the act S120 and the act S130 may be executed simultaneously. The above is not defined in embodiments of the present disclosure.

At act S140, the target video having the target length is generated according to the compared result and the main position interval.

As it can be seen from descriptions of S120, there are two compared results by comparing the original length Ls of the original video to the target length Lt. One of the two compared results is that the original length Ls of the original video is greater than the target length Lt; while another is that the original length Ls of the original video is smaller than the target length Lt.

When the compared result is that the original length Ls of the original video is greater than the target length Lt, the act S140 may include the followings.

At step 1, it is determined whether a length L1 of the main position interval is not smaller than the target length Lt, if yes, a step 2 is executed, and if no, a step 3 is executed.

At step 2, a partial video having a length L2 is taken from a video corresponding to the main position interval, where a proportion between L2 and Lt is preset. Further, at least one partial video having a length L3 is taken from at least one video non-corresponding to the main position interval according to a preset number N and a preset intercept position, where L3=(Lt−L2)/(N−1). Then, the partial video having the length L2 and the at least one partial video having the length L3 are stitched, so as to generate the target video having the target length.

It is to be illustrated that the proportion, the number N and the intercept position may be set and adjusted according to practical solutions.

For example, the proportion may be set as 70% and the number N may be set as 3. If a middle part of the original video is selected as the main position interval of the original video, in addition to obtaining the partial video having the length L2 by taking from the video corresponding to the main position interval, two partial videos having the length L3 are obtained by taking from the videos non-corresponding to the main position interval according to the preset intercept position, such as a starting position and an end position. L3=(Lt−L2)/(N−1)=(Lt−Lt*70%)/(3−1)=Lt*30%/2.

The taken partial videos are stitched according to a sequence thereof in the original video, so as to generate the target video having the target length.

At step 3, a partial video corresponding to the main position interval is taken from the original video. Furthermore, at least one partial video having a length L4 is taken from at least one video non-corresponding to the main position interval according to a preset number N and a preset intercept position, where L4=(Lt−L1)/(N−1). Moreover, the partial video corresponding to the main position interval and the at least one partial video having the length L4 are stitched, so as to generate the target video having the target length.

If the length of the main position interval L is smaller than the target length Lt, a partial video corresponding to the main position interval is taken from the original video directly. At least one partial video having a length L4 is taken from at least one video non-corresponding to the main position interval according to a preset number N and a preset intercept position, where L4=(Lt−L1)/(N−1). The taken partial videos are stitched, so as to generate the target video having the target length.

In order to understand conveniently, a case that the original length Ls of the original video is greater than the target length Lt, an example is taken to illustrate processing the original video.

It is assumed that the original length Ls of the original video is 50 s. The main position interval of the original video selected according to the preset selection rule is a time period 16 s~24 s. That is, the video within this time period may be better representative of the original video. Therefore, most of time periods of the target video may be set within this time period.

If the target length Lt of the target video is 6 s, a partial video having the length L2 of 4.2 s may be taken from the video corresponding to the main position interval. The proportion between this length and the target length Lt satisfies a preset first proportion limitation. Furthermore, the two partial videos having the length 1.9 s may be taken from a head part of the original video and a tail part of the original video respectively. The taken partial videos are stitched according to a sequence of the taken partial videos in the original video to generate the target video having 6 s.

If the target length Lt of the target video is 10 s, the partial video corresponding to the main position interval of the original video may be taken from the original video. Furthermore, the two partial videos having the length is may be taken from the head part of the original video and the tail part of the original video respectively. The taken partial videos are stitched according to the sequence of the taken partial videos in the original video so as to generate the target video having 10 s.

In such target video generated, not only the main content desired to be shown in the original video is shown, but also the video non-corresponding to the main position interval is taken into consideration, which may be better representative of the original video.

During a process of stitching the partial videos, some transitional effects may be introduced into the adjacent partial videos to achieve transitional effect. The method for introducing the transitional effects belongs to the related art, which is not defined in embodiments of the present disclosure.

In a case that the compared result is that the original length Ls of the original video is smaller than the target length Lt, the original video may be set as the video corresponding to the main position interval of the original video, and the act S140 may include the followings.

At step 1, at least one partial video having a length L5 is taken from the original video according to a preset number N and a preset intercept position, in which L5=(Lt−Ls)/N.

At step 2, the original video and the at least one partial video having the length L5 are stitched, so as to generate the target video having the target length.

For example, if the original length of the original video is 50 s, and the target length of the target video is 70 s, the original length may be directly set as the video corresponding to the main position interval of the original video. Then, partial videos within the time periods 0 s~5 s, 20 s~25 s, 30 s~35 s and 44 s~49 s are taken from the original video. These partial videos and the original video are stitched, so as to generate the target video having 70 s. These partial original videos may be positioned in front of the original video, or behind of the original video. When the partial videos are positioned in front of the original video, it indicates that before the original video is played, a foreshow having a preview effect of the original video is played. When the partial videos are positioned behind of the original video, it indicates that after the original video is played, a sideshow of the original video is played. Certainly, in a process of stitching, transitional effects may be introduced between the adjacent partial videos to achieve transitional effect.

By applying the technical solutions provided in embodiments of the present disclosure, after the processing instruction to the original video is acquired, the main position interval of the original video is selected according to the preset selection rule, and the target video having the target length is generated according to the compared result between the original length of the original video and the target length and the main position interval. Therefore, the target video obtained by processing the original video may be better representative of the main content of the original video.

Figure 2:
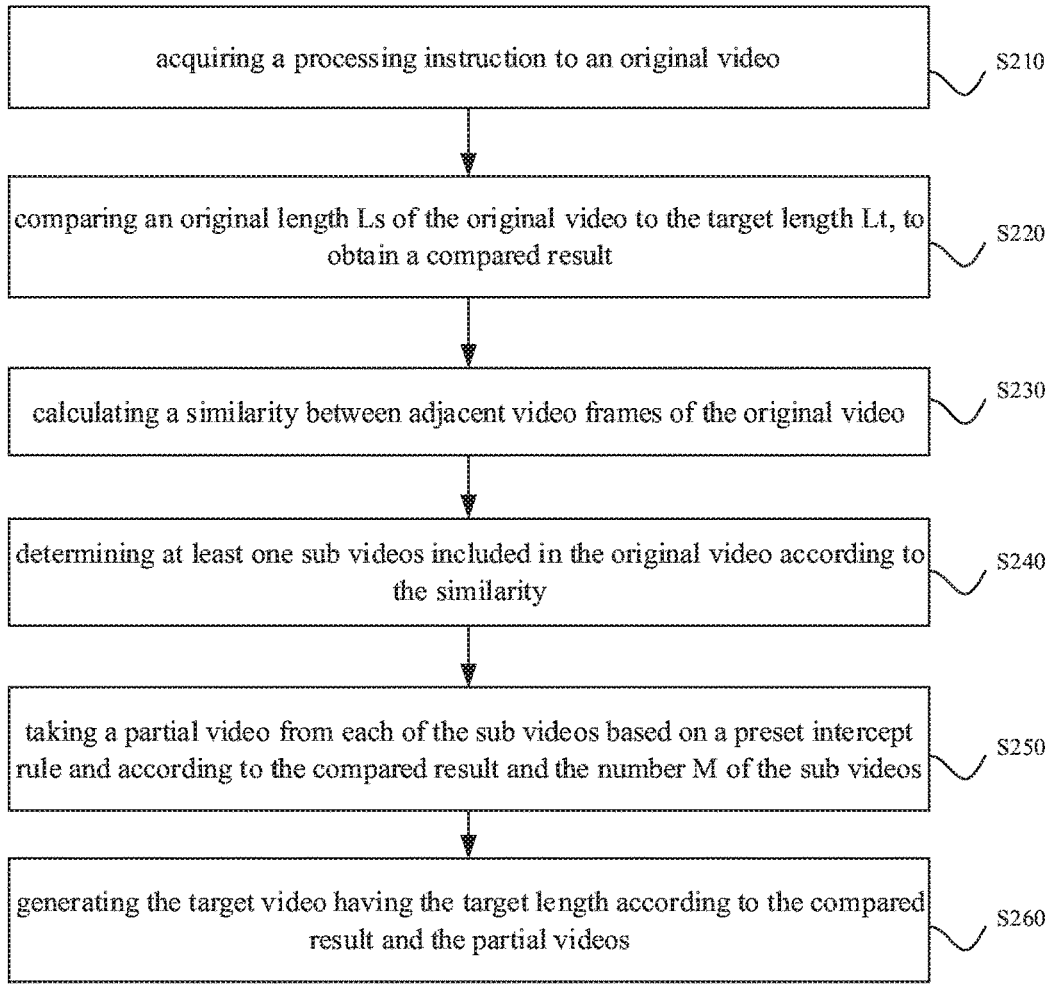
FIG. 2 is another flow chart illustrating a method for processing a video provided in embodiments of the present disclosure.

As illustrated in FIG. 2, FIG. 2 is another flow chart illustrating a method for processing a video provided in embodiments of the present disclosure. The method may include the followings.

At act S210, a processing instruction to an original video is acquired.

The processing instruction may include information on a target length Lt of a target video.

In practical applications, when it is required to process an original video such that a length of the target video after the processing satisfies the target length, technical solutions provided in embodiments of the present disclosure may be applied to process the original video. A common application is that, when a user wants to share one video on a website, as a length of a shared video is defined by the website, the video to be shared may not satisfy a length requirement of the website. In this case, the user may apply the technical solutions provided in embodiments of the present disclosure to process the original video to be shared by the user, such that the target video after the processing may satisfy the length requirement of the website. Alternatively, the technical solutions provided in embodiments of the present disclosure may be applied by the website to process the original video uploaded by the user, such that the target video after the processing satisfy the length requirement of the website.

After the processing instruction to the original video sent by the user or by the website is received, operations of an act S220 or an act S230 may be executed. The processing instruction may include information on the target length Lt of the target video. The target video is one generated after the original video is processed.

At act S220, an original length Ls of the original video is compared to the target length Lt, so as to obtain a compared result.

There is a size relation between the original length Ls of the original video and the target length Lt of the target video. By comparing the original length Ls of the original video to the target length Lt, the compared result may be obtained. It is to be illustrated that, processing a video by applying the technical solutions provided in embodiments of the present disclosure is to make a length of a processed video conform to the target length. When the original length Ls of the original video is same with the target length Lt, the user may directly share the original video without processing the original video.

At act S230, a similarity between adjacent video frames of the original video is calculated.

At act S240, for any adjacent video frames, when the similarity is smaller than a preset threshold, it is determined that the adjacent video frames belong to sub videos having different scenes respectively.

It may be understood that, an original video may be captured in multiply scenes. The similarity of the adjacent video frames of the same scene is relatively high, while the similarity of the adjacent video frames of the different scenes is relatively low. According to the similarity of the adjacent video frames of the original video, at least one sub video included in the original video may be determined. The different sub videos may be understood as videos having different scenes.

After the similarity of the adjacent video frames included in the original video is calculated, for any adjacent video frames, if the similarity is lower than the present threshold, it is determined that the scenes are switched between the adjacent video frames, and it is thus determined that the adjacent video frames belong to sub videos having different scenes respectively.

It is to be illustrated that, after the processing instruction to the original video is obtained, the act S220 may be executed firstly and the act S230 may then be executed. Furthermore, the act S230 may be executed firstly and the act S220 may be then executed. Furthermore, the act S220 and the act S230 may be executed simultaneously. The above is not defined in embodiments of the present disclosure.

At act S250, a partial video is taken from each of the sub videos based on a preset intercept rule and according to the compared result and the number M of the sub videos.

At act S260, the target video having the target length is generated according to the compared result and the partial videos.

In order to make descriptions simply, the act S250 and the act S260 are combined to illustrate.

As it can be seen from descriptions of S220, there are two compared results by comparing the original length Ls of the original video to the target length Lt. One of the two compared results is that the original length Ls of the original video is greater than the target length Lt; while another is that the original length Ls of the original video is smaller than the target length Lt. A partial video is taken from each of the sub videos based on a preset intercept rule and according to the compared result and the number M of the sub videos. The preset intercept rule may be: taking on average or based on a proportion, which can be set and adjusted according to practical solutions. The target video having the target length may be generated according to the compared result and the taken partial videos.

In a specific implementation of the present disclosure, when the compared result is that the original length Ls of the original video is greater than the target length Lt, the act S250 may include the followings.

A partial video having a length L6 is taken from each of the sub videos, where L6=Lt/M;

or a partial video satisfying a preset proportion requirement is taken from each of the sub videos.

The act S260 may include the followings.

The target video having the target length is generated by stitching the partial videos taken from the respective sub videos.

When the original length Ls of the original video is greater than the target length Lt, partial videos having the length L6 may be taken from the respective sub videos respectively, where L6=Lt/M. For example, if the number M of the sub videos is 4, and the target length Lt is 10 s, the partial videos having the length 10 s/4=2.5 s may be taken from each of the sub videos respectively.

Alternatively, a partial video satisfying a preset proportion requirement is taken from each of the sub videos. For example, when the number M of the sub videos is 4 and the target length Lt is 10 s, according to the preset proportion requirement, such as 20%, 20%, 30% and 20%, a partial video having a length 2 s is taken from a first sub video, a video having the length 3 s is taken from a second sub video, a video having the length 3 s is taken from a third sub video and a video having the length 2 s is taken from a fourth sub video.

After the partial video is taken from each of the sub videos, the target video having the target length is generated by stitching each partial video. In such target video generated, content of all scenes of the original video is taken into consideration, which may be better representative of the original video.

During a process of stitching the partial videos, some transitional effects may be introduced into the adjacent partial videos to achieve transitional effect. The method for introducing the transitional effects belongs to the related art, which is not defined in embodiments of the present disclosure.

In a specific implementation of the present disclosure, when the compared result is that the original length Ls of the original video is smaller than the target length Lt, the act S250 may include the followings.

A partial video having a length L7 is taken from each of the sub videos, where L7=(Lt−Ls)/M.

The act S260 may include the followings.

The target video having the target length is generated by stitching the partial videos taken from the respective sub videos.

When the original length Ls of the original video is smaller than the target length Lt, the partial videos having the length L7 may be taken from the sub videos respectively, where L7=(Lt−Ls)/M. For example, if the original length of the original video is 50 s, the number M of the sub videos is 4, and the target length Ls is 70 s, the partial video having the length (70 s−50 s)/4=5 s may be taken from each of the sub videos respectively.

The partial videos are stitched with the original video, so as to generate the target video having the target length. For example, if the original length of the original video is 50 s, the number M of the sub videos is 4, and the target length Lt is 70 s, the partial videos having the length (70 s−50 s)/4=5 s may be taken from each of the sub videos, then, the partial videos are stitched with the original video to generate the target video having 70 s. These partial videos may be positioned in front of the original video, or behind of the original video. When the partial videos are positioned in front of the original video, it indicates that before the original video is played, a foreshow having a preview effect of the original video is played. When the partial videos are positioned behind of the original video, it indicates that after the original video is played, a sideshow of the original video is played. Certainly, in a process of stitching, transitional effects may be introduced between the adjacent partial videos to achieve transitional effect.

By applying the technical solutions provided in embodiments of the present disclosure, after the processing instruction to the original video is acquired, at least one sub video included in the original video is determined according to the similarity between the adjacent video frames of the original video, and the partial video is taken from each sub video according to the compared result between the original length of the original video and the target length and the number of the at least one sub video, then the target video having the target length is generated according to the compared result between the original length of the original video and the target length and each partial video. Therefore, the target video obtained by processing the original video may be better representative of main content of the original video.

Figure 3:
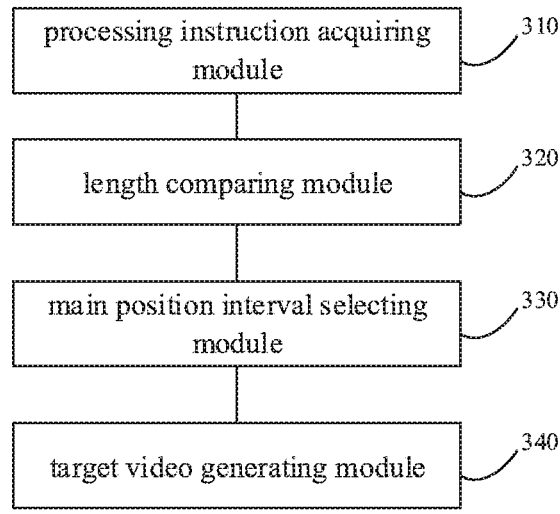
FIG. 3 is a block diagram illustrating a device for processing a video provided in embodiments of the present disclosure.

Corresponding to method embodiments illustrated in FIG. 1, embodiments of the present disclosure further provide a device for processing a video. As illustrated in FIG. 3, the device includes a processing instruction acquiring module 310, a length comparing module 320, a main position interval selecting module 330 and a target video generating module 340.

The processing instruction acquiring module 310 is configured to acquire a processing instruction to an original video. The processing instruction may include information on a target length Lt of a target video.

The length comparing module 320 is configured to compare an original length Ls of the original video to the target length Lt, so as to obtain a compared result.

The main position interval selecting module 330 is configured to select a main position interval of the original video according to a preset selection rule.

The target video generating module 340 is configured to generate the target video having the target length according to the compared result and the main position interval.

In a specific implementation of the present disclosure, the main position interval selecting module 330 is further configured to:

when the processing instruction further includes information on a content category of the original video, select the main position interval corresponding to the content category of the original video according to a preset correspondence between content categories and main position intervals.

In a specific implementation of the present disclosure, the main position interval selecting module 330 is configured to:

calculate a similarity between adjacent video frames of the original video;

for any adjacent video frames, when the similarity is smaller than a preset threshold, determine that the adjacent video frames belong to sub videos having different scenes respectively; and determine a position interval in which the sub video having a longest length is located as the main position interval of the original video.

In a specific implementation of the present disclosure, the target video generating module 340 is further configured to:

when the compared result is that the original length Ls of the original video is greater than the target length Lt, and when a length L1 of the main position interval is not smaller than the target length Lt, take a partial video having a length L2 from a video corresponding to the main position interval, in which a proportion between L2 and Lt is preset;

take at least one partial video having a length L3 from at least one video non-corresponding to the main position interval according to a preset number N and a preset intercept position, in which L3=(Lt−L2)/(N−1); and stitch the partial video having the length L2 and the at least one partial video having the length L3, to generate the target video having the target length.

In a specific implementation of the present disclosure, the target video generating module 340 is further configured to:

when the original length Ls of the original video is greater than the target length Lt, and when a length L1 of the main position interval is smaller than the target length Lt, take a partial video corresponding to the main position interval from the original video;

take at least one partial video having a length L4 from at least one video non-corresponding to the main position interval according to a preset number N and a preset intercept position, in which L4=(Lt−L1)/(N−1); and stitch the partial video corresponding to the main position interval and the at least one partial video having the length L4, to generate the target video having the target length.

In a specific implementation of the present disclosure, the target video generating module 340 is further configured to:

when the compared result is that the original length Ls of the original video is smaller than the target length Lt, set the original video as a partial video corresponding to the main position interval of the original video;

take at least one partial video having a length L5 from the original video according to a preset number N and a preset intercept position, in which L5=(Lt−Ls)/N; and stitch the original video and the at least one partial video having the length L5, to generate the target video having the target length.

By applying the technical solutions provided in embodiments of the present disclosure, after the processing instruction to the original video is acquired, the main position interval of the original video is selected according to the preset selection rule, and the target video having the target length is generated according to the compared result between the original length of the original video and the target length and the main position interval. Therefore, the target video obtained by processing the original video may be better representative of the main content of the original video.

Figure 4:
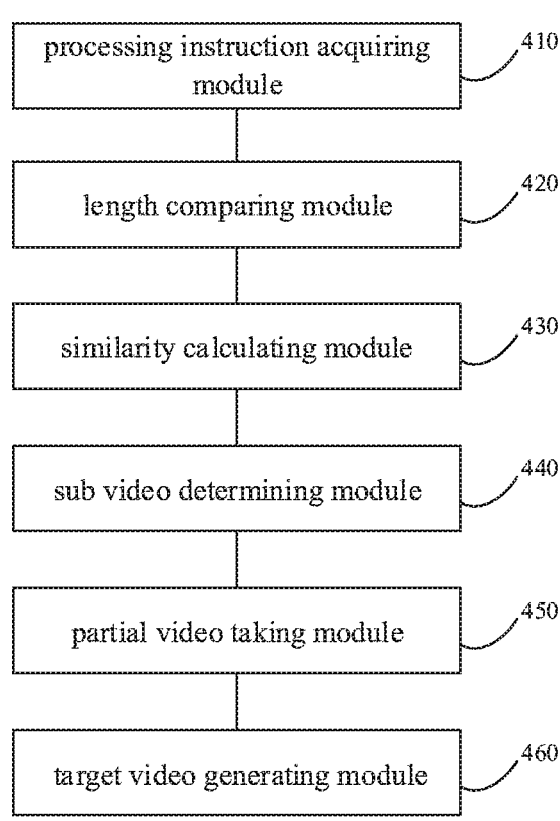
FIG. 4 is another block diagram illustrating a device for processing a video provided in embodiments of the present disclosure.

Corresponding to method embodiments illustrated by FIG. 2, embodiments of the present disclosure further provide a device for processing a video. As illustrated in FIG. 4, the device includes a processing instruction acquiring module 410, a length comparing module 420, a similarity calculating module 430, a sub video determining module 440, a partial video taking module 450 and a target video generating module 460.

The processing instruction acquiring module 410 is configured to acquire a processing instruction to an original video. The processing instruction may include information on a target length Lt of a target video.

The length comparing module 420 is configured to compare an original length Ls of the original video to the target length Lt, so as to obtain a compared result.

The similarity calculating module 430 is configured to calculate a similarity between adjacent video frames of the original video.

The sub video determining module 440 is configured to, for any adjacent video frames, when the similarity is smaller than a preset threshold, determine that the adjacent video frames belong to sub videos having different scenes respectively.

The partial video taking module 450 is configured to take a partial video from each of the sub videos based on a preset intercept rule and according to the compared result and the number M of the sub videos.

The target video generating module 460 is configured to generate the target video having the target length according to the compared result and the partial videos.

In a specific implementation of the present disclosure, the partial video cutting module 450 is configured to:

when the original length Ls of the original video is greater than the target length Lt, take a partial video having a length L6 from each of the sub videos, in which L6=Lt/M;

or, obtain a partial video satisfying a preset proportion requirement from each of the sub videos.

The target video generating module 460 is configured to:

when the original length Ls of the original video is greater than the target length Lt, stitch the partial videos taken from the respective sub videos to generate the target video having the target length.

In a specific implementation of the present disclosure, the partial video cutting module 450 is configured to:

when the compared result is that the original length Ls of the original video is smaller than the target length Lt, take a partial video having a length L7 from each of the sub videos, in which L7=(Lt−Ls)/M.

The target video generating module 460 is configured to:

when the original length Ls of the original video is smaller than the target length Lt, stitch the partial videos taken from the respective sub videos to generate the target video having the target length.

By applying the device provided in embodiments of the present disclosure, after the processing instruction to the original video is acquired, at least one sub video included in the original video is determined according to the similarity between the adjacent video frames of the original video, and the partial video is taken from each sub video according to the compared result between the original length of the original video and the target length and the number of the at least one sub video, then the target video having the target length is generated according to the compared result between the original length of the original video and the target length and each partial video. Therefore, the target video obtained by processing the original video may be better representative of main content of the original video.

Accordingly, embodiments of the present disclosure further provide an electronic device.

The electronic device includes a processor, a memory, a communication interface and a bus.

The processor, the memory and the communication interface are coupled and communicate with each other via the bus.

The memory is configured to store executable program codes.

The processor is configured to run a program corresponding to the executable program codes by reading the executable program codes stored in the memory, to perform a method for processing a video of embodiments illustrated in FIG. 1.

Accordingly, embodiments of the present disclosure further provide an electronic device.

The electronic device includes a processor, a memory, a communication interface and a bus.

The processor, the memory and the communication interface are coupled and communicate with each other via the bus.

The memory is configured to store executable program codes.

The processor is configured to run a program corresponding to the executable program codes by reading the executable program codes stored in the memory, to perform a method for processing a video of embodiments illustrated in FIG. 2.

Accordingly, embodiments of the present disclosure further provide a storage medium. The storage medium is configured to store executable program codes. When the executable program codes are running, a method for processing a video of embodiments illustrated in FIG. 1 is executed.

Accordingly, embodiments of the present disclosure further provide a storage medium. The storage medium is configured to store executable program codes. When the executable program codes are running, a method for processing a video of embodiments illustrated in FIG. 2 is executed.

Accordingly, embodiments of the present disclosure further provide an application program. When the application program is running, a method for processing a video of embodiments illustrated by FIG. 1 is executed.

Accordingly, embodiments of the present disclosure further provide an application program. When the application program is running, a method for processing a video of embodiments illustrated by FIG. 2 is executed.

Regarding to embodiments of the device, the electronic device, the storage medium and the application program, as being similar to method embodiments, they are described simply. Related descriptions may be referred to corresponding parts of the method embodiments.

It is to be illustrated that, in the specification, terms such as "first" and "second" are configured herein for distinguishing one entity or operation from another entity or operation, but may not indicate or imply that these entities and operations have an actual relation and an actual sequence regarding to each other. Furthermore, the terms such as "include", "comprise" and any other variations are intended to be non-exclusive and covering-meaning, such that a process, a method, a subject or a device including or comprising a sequence of components not only includes or comprises those components, but includes or comprises other components that are not listed in the sequence, or further includes or comprises inherent components of the process, the method, the subject or the device. Without any more limitations, components defined by a sentence such as "include a . . . or comprise a . . . " are not exclusive to be included or comprised in the process, the method, the subject or the device, further they include or comprise other additional components.

Embodiments of the specification are described in relation with other embodiments. Similar parts of the embodiments may be referred to other embodiments. The description made to each embodiment emphasizes differences from other embodiments. Particularly, as being similar to the method embodiments, device embodiments are described simply. Details may be referred to corresponding parts of the device embodiments.

It may be understood by those skilled in the art that, all of or a part of steps for achieving above method implementations may be realized by controlling related software via a program. The program may be stored in a computer readable access storage medium. The so-called storage medium is for example ROM/RAM, a diskette or a compact disc.

The above embodiments are merely preferable embodiments of the present disclosure, but are not construed to limit a protection scope of the present disclosure. Changes, alternatives and improvements made within the spirit and scope of the present disclosure, should be covered by the scope of the present disclosure.

What is claimed is:

1. A method for processing a video, comprising:
acquiring a processing instruction to an original video, wherein the processing instruction comprises information on a target length Lt of a target video;
comparing an original length Ls of the original video to the target length Lt, to obtain a compared result;
selecting a main position interval of the original video according to a preset selection rule; and
generating the target video having the target length according to the compared result and the main position interval;
wherein selecting the main position interval of the original video according to the preset selection rule comprises:
calculating a similarity between adjacent video frames of the original video;
for any adjacent video frames, when the similarity is smaller than a preset threshold, determining that the adjacent video frames belong to sub videos having different scenes respectively; and
determining a position interval in which the sub video having a longest length is located as the main position interval of the original video.

2. The method according to claim 1, wherein the processing instruction further comprises information on a content category of the original video; and
selecting a main position interval of the original video according to a preset selection rule comprises:
selecting the main position interval corresponding to the content category of the original video according to a preset correspondence between content categories and main position intervals.

3. The method according to claim 1, wherein, when the compared result is that the original length Ls of the original video is greater than the target length Lt, generating the target video having the target length according to the compared result and the main position interval comprises:
when a length L1 of the main position interval is not smaller than the target length Lt, taking a partial video having a length L2 from a video corresponding to the main position interval, wherein a proportion between L2 and Lt is preset;
taking at least one partial video having a length L3 from at least one video non-corresponding to the main position interval according to a preset number N and a preset intercept position, wherein L3=(Lt−L2)/(N−1); and
stitching the partial video having the length L2 and the at least one partial video having the length L3 to generate the target video having the target length.

4. The method according to claim 1, wherein, when the compared result is that the original length Ls of the original video is greater than the target length Lt, generating the target video having the target length according to the compared result and the main position interval comprises:

when a length L1 of the main position interval is smaller than the target length Lt, taking a partial video corresponding to the main position interval from the original video;

taking at least one partial video having a length L4 from at least one video non-corresponding to the main position interval according to a preset number N and a preset intercept position, wherein L4=(Lt−L1)/(N−1);

stitching the partial video corresponding to the main position interval and the at least one partial video having the length L4, to generate the target video having the target length.

5. The method according to claim 1, wherein, when the compared result is that the original length Ls of the original video is smaller than the target length Lt, the original video is set as a partial video corresponding to the main position interval of the original video; and generating the target video having the target length according to the compared result and the main position interval comprises:

taking at least one partial video having a length L5 from the original video according to a preset number N and a preset intercept position, wherein L5=(Lt−Ls)/N; and stitching the original video and the at least one partial video having the length L5, to generate the target video having the target length.

6. An electronic device, comprising:

a processor, a memory, a communication interface and a bus;

wherein the processor, the memory and the communication interface are coupled and communicate with each other via the bus;

the memory is configured to store executable program codes; and the processor is configured to run a program corresponding to the executable program codes by reading the executable program codes stored in the memory, to perform a method for processing a video, the method comprising:

acquiring a processing instruction to an original video, wherein the processing instruction comprises information on a target length Lt of a target video;

comparing an original length Ls of the original video to the target length Lt, to obtain a compared result;

selecting a main position interval of the original video according to a preset selection rule; and generating the target video having the target length according to the compared result and the main position interval;

and wherein the processor is configured to select the main position interval of the original video according to the preset selection rule by acts of:

calculating a similarity between adjacent video frames of the original video;

for any adjacent video frames, when the similarity is smaller than a preset threshold, determining that the adjacent video frames belong to sub videos having different scenes respectively; and determining a position interval in which the sub video having a longest length is located as the main position interval of the original video.

7. The electronic device according to claim 6, wherein the processing instruction further comprises information on a content category of the original video; the processor is configured to select a main position interval of the original video according to a preset selection rule by acts of:

selecting the main position interval corresponding to the content category of the original video according to a preset correspondence between content categories and main position intervals.

8. The electronic device according to claim 6, wherein, the processor is configured to generate the target video having the target length according to the compared result and the main position interval by acts of:

when the compared result is that the original length Ls of the original video is greater than the target length Lt, and when a length L1 of the main position interval is not smaller than the target length Lt, taking a partial video having a length L2 from a video corresponding to the main position interval, wherein a proportion between L2 and Lt is preset;

taking at least one partial video having a length L3 from at least one video non-corresponding to the main position interval according to a preset number N and a preset intercept position, wherein L3=(Lt−L2)/(N−1);

stitching the partial video having the length L2 and the at least one partial video having the length L3 to generate the target video having the target length.

9. The electronic device according to claim 6, wherein, the processor is configured to generate the target video having the target length according to the compared result and the main position interval by acts of:

when the compared result is that the original length Ls of the original video is greater than the target length Lt, and when a length L1 of the main position interval is smaller than the target length Lt, taking a partial video corresponding to the main position interval from the original video;

taking at least one partial video having a length L4 from at least one video non-corresponding to the main position interval according to a preset number N and a preset intercept position, wherein L4=(Lt−L1)/(N−1);

stitching the partial video corresponding to the main position interval and the at least one partial video having the length L4, to generate the target video having the target length.

10. The electronic device according to claim 6, wherein, the processor is configured to generate the target video having the target length according to the compared result and the main position interval by acts of:

when the compared result is that the original length Ls of the original video is smaller than the target length Lt, setting the original video as a partial video corresponding to the main position interval of the original video;

taking at least one partial video having a length L5 from the original video according to a preset number N and a preset intercept position, wherein L5=(Lt−Ls)/N; and stitching the original video and the at least one partial video having the length L5, to generate the target video having the target length.

11. A non-transitory computer-readable storage medium, configured to store executable program codes; wherein, when the executable program codes are running, a method for processing a video is executed, the method comprising:

acquiring a processing instruction to an original video, wherein the processing instruction comprises information on a target length Lt of a target video;

comparing an original length Ls of the original video to the target length Lt, to obtain a compared result;

selecting a main position interval of the original video according to a preset selection rule; and generating the target video having the target length according to the compared result and the main position interval;

wherein selecting the main position interval of the original video according to the preset selection rule comprises:

calculating a similarity between adjacent video frames of the original video;

for any adjacent video frames, when the similarity is smaller than a preset threshold, determining that the adjacent video frames belong to sub videos having different scenes respectively; and determining a position interval in which the sub video having a longest length is located as the main position interval of the original video.

12. The non-transitory computer-readable storage medium according to claim 11, wherein the processing instruction further comprises information on a content category of the original video; and selecting a main position interval of the original video according to a preset selection rule comprises:

selecting the main position interval corresponding to the content category of the original video according to a preset correspondence between content categories and main position intervals.

13. The non-transitory computer-readable storage medium according to claim 11, wherein, when the compared result is that the original length Ls of the original video is greater than the target length Lt, generating the target video having the target length according to the compared result and the main position interval comprises:

when a length L1 of the main position interval is not smaller than the target length Lt, taking a partial video having a length L2 from a video corresponding to the main position interval, wherein a proportion between L2 and Lt is preset;

taking at least one partial video having a length L3 from at least one video non-corresponding to the main position interval according to a preset number N and a preset intercept position, wherein L3=(Lt−L2)/(N−1); and stitching the partial video having the length L2 and the at least one partial video having the length L3 to generate the target video having the target length.

14. The non-transitory computer-readable storage medium according to claim 11, wherein, when the compared result is that the original length Ls of the original video is greater than the target length Lt, generating the target video having the target length according to the compared result and the main position interval comprises:

when a length L1 of the main position interval is smaller than the target length Lt, taking a partial video corresponding to the main position interval from the original video;

taking at least one partial video having a length L4 from at least one video non-corresponding to the main position interval according to a preset number N and a preset intercept position, wherein L4=(Lt−L1)/(N−1);

stitching the partial video corresponding to the main position interval and the at least one partial video having the length L4, to generate the target video having the target length.

15. The non-transitory computer-readable storage medium according to claim 11, wherein, when the compared result is that the original length Ls of the original video is smaller than the target length Lt, the original video is set as a partial video corresponding to the main position interval of the original video; and generating the target video having the target length according to the compared result and the main position interval comprises:

taking at least one partial video having a length L5 from the original video according to a preset number N and a preset intercept position, wherein L5=(Lt−Ls)/N; and stitching the original video and the at least one partial video having the length L5, to generate the target video having the target length.

* * * * *